Figure 1:
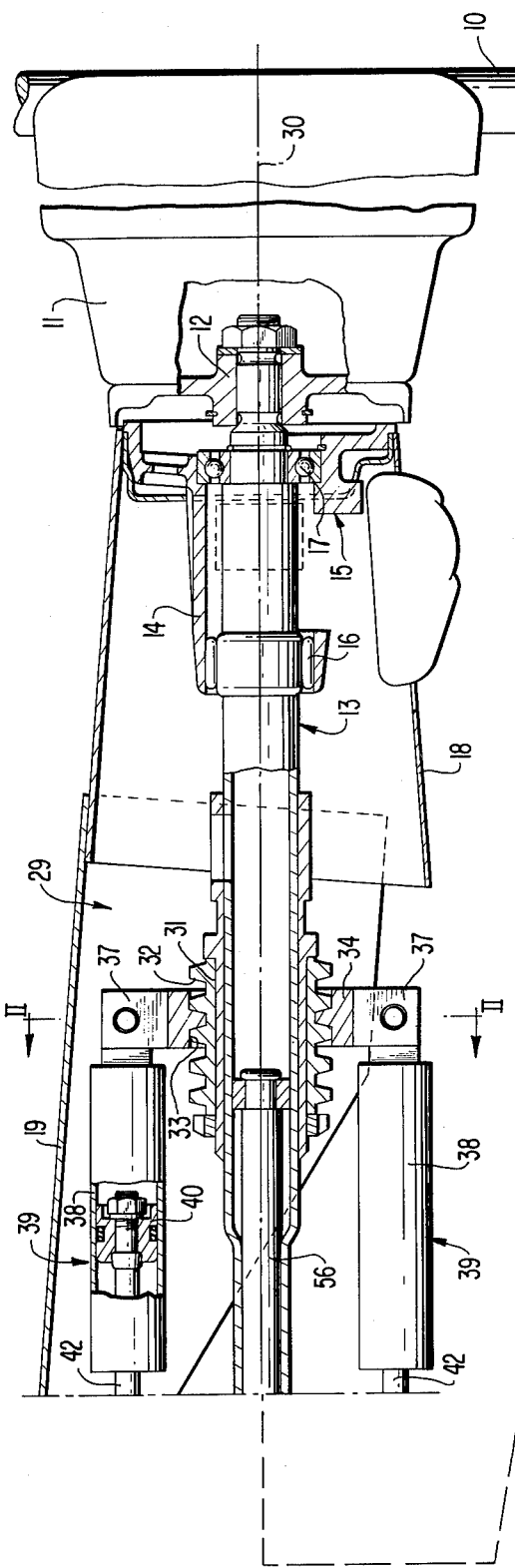

United States Patent [19]

Niemann et al.

[11] 4,067,247

[45] Jan. 10, 1978

[54] STEERING MECHANISM WITH DERIVATIVE ACTION TIMER

[75] Inventors: Klaus Niemann, Weinstadt-Endersbach; Helmut Wulf, Nellingen, both of Germany

[73] Assignee: Daimler-Benz Aktiengesellschaft, Germany

[21] Appl. No.: 645,327

[22] Filed: Dec. 30, 1975

[30] Foreign Application Priority Data

Jan. 17, 1975 Germany .............................. 2501752

[51] Int. Cl.² .......................... B62D 1/20; B62D 5/06
[52] U.S. Cl. .................................. 74/499; 74/388 PS; 91/391 R
[58] Field of Search ................... 74/388 PS, 492, 496, 74/497, 498, 500; 91/391 R; 180/133

[56] References Cited

U.S. PATENT DOCUMENTS

| | | | |
|---|---|---|---|
| 1,719,875 | 7/1929 | Cooper | 91/391 R X |
| 2,968,189 | 1/1961 | Walko | 74/496 X |
| 3,916,730 | 11/1975 | Sheppard | 74/388 PS X |

*Primary Examiner*—Allan D. Herrmann
*Attorney, Agent, or Firm*—Craig & Antonelli

[57] ABSTRACT

A steering mechanism with time-rate action for vehicles, which includes a first adjusting member having an adjusting path dependent on the wheel deflection angle which is coupled with the steered vehicle wheels, a second adjusting member with an adjusting path dependent on the angle of the steering wheel deflection which is coupled with this steering wheel and a third adjusting member having an adjusting path dependent on the angular velocity of the steering wheel deflection which is coupled with the steering wheel by way of a mechanism producing an adjusting magnitude dependent on the angular velocity of the steering wheel deflection, whereby the second adjusting member is gearingly connected without interposition of any elastic means with the steering wheel as also with the two other adjusting members by way of a summation gear.

29 Claims, 2 Drawing Figures

U.S. Patent  Jan. 10, 1978  4,067,247

STEERING MECHANISM WITH DERIVATIVE ACTION TIMER

The present invention relates to a steering mechanism with timerate action or derivative action for vehicles, especially for motor vehicles, in which the wheel deflection angle of the steered vehicle wheels is composed of an angle component dependent on the angle of the steering-hand-wheel deflection and of an angle component dependent on the angular velocity of the steering-hand-wheel deflection, with a first adjusting member coupled with the steered vehicle wheels and having an adjusting path dependent on the wheel deflection angle and with a second adjusting member coupled with the steering-hand-wheel and having an adjusting path dependent on the angle of the steering-hand-wheel deflection, and a third adjusting member coupled with the steering-hand-wheel by means of a mechanism for producing an adjusting magnitude dependent on the angular velocity of the steering-hand-wheel deflection and having an adjusting path dependent on this angular velocity. "Such an adjusting arrangement provides for the damping of the effect of rapid steering wheel movements by way of the third adjusting member reducing the rotational movement of a steering spindle connected to the steered wheels or to a shaft of a steering servomechanism. This damping is a function of the angular velocity of steering wheel movement."

In a known steering mechanism of this type (Wallner: "Investigation of the System Vehicle-Driver In a Steering System with Time-Rate Action", Test Report No. 47 of the Institute for Motor Vehicles of the Technical University, Berlin, July, 1968), the wheel deflection angle of the steered vehicle wheels which do not have any gearing connection with the steering-hand-wheel, is established or adjusted with the aid of a servo-motor. The valve-adjusting member of the control valve controlling the servo-motor is actuated both by way of a damper cylinder of a hydraulic telescopic damper operating as adjusting member with an adjusting path dependent on the angular velocity of the steering-wheel deflection as also by way of an adjusting spring operating as adjusting member with an adjusting path dependent on the angle of the steering wheel deflection. Whereas the damping cylinder is supported by way of a support spring against an abutment immovable or fixed relative to the vehicle, the adjusting spring is connected with the piston rod of the damper piston operating in the damper cylinder and this piston rod is connected with the steering-hand-wheel by way of a steering gear. The damping resistance of the telescopic damper or shock-absorber dependent on the relative velocity between damper piston and damper cylinder and therewith on the angular velocity of the steering wheel deflection, is in equilibrium with the spring force of the support spring whose spring path as well as that of the spring path of the adjusting spring dependent on the angle of the steering wheel deflection is transmitted by gear means onto the valve-adjusting member. In order that in this arrangement the rate action or derivative action effect of the telescopic damper is not cancelled out again or delayed by the adjusting spring, the spring constant of the adjusting spring must be very small.

Apart from the fact that with the known steering mechanism, an emergency steering by hand is not possible in case of failure of the servo-assist by reason of the lack of a gearing connection between the steering wheel and the steered vehicle wheels, the known steering mechanism, by reason of the high elasticity of its adjusting spring, is also not suitable without further measures to be re-equipped for a pure manual steering without servo-assist.

The present invention is concerned with the task to provide a steering mechanism with time rate action or time derivative action of the aforementioned type which includes a gearing connection between steering hand-wheel and vehicle wheels.

The underlying problems are solved according to the present invention in that the non-springy or non-elastic adjusting member having an adjusting path dependent on the angle of the steering-hand-wheel deflection is gearingly connected respectively without interposition of springy means both with the steering hand-wheel as also with the two other adjusting members by way of a summing gear.

In the steering mechanism according to the present invention, the component of the wheel deflection dependent on the angle of the steering-hand-wheel deflection can be transmitted to the steered vehicle wheels by way of the customary steering parts such as steering shaft, steering gear and steering linkage. The summation gear can be interconnected into these steering parts at any suitable place—for example, into the steering spindle or into the steering linkage—, with the aid of which the angle component dependent on the angular velocity of the steering-wheel deflection is superimposed on the angle component of the wheel deflection dependent on the angle of the steering-wheel deflection. The angle component dependent on the angular-velocity of the steering wheel deflection may be produced, for example, in the same manner as in the known steering mechanism by a hydraulic damper suspended at a support spring, in which one of the two damping members movable relative to one another is actuated by the steering-hand-wheel. In this case, the support spring still represents a delay member or an elasticity for the steering force transmission during the transmission of the steering movement to the summation gear, which, however, can be compensated for without any difficulties by the selection of a suitable transmission ratio for the gearing connection between the steering-hand-wheel and the associated damping member in the sense of a higher damping force, on the one hand, in conjunction with the use of a support spring having a very high spring constant, on the other. As a result thereof, the steering mechanism can be constructed for the transmission also of larger steering forces and can then operate as pure manual steering system. On the other hand, also a known servo-steering gear can be controlled by means of the steering mechanism according to the present invention, in which also in case of failure of the servo-force a gearing connection between the steering hand-wheel and steered vehicle wheels remains preserved or is engaged.

Accordingly, it is an object of the present invention to provide a steering mechanism with time derivative action which avoids by simple means the aforementioned shortcomings and drawbacks encountered in the prior art.

Another object of the present invention resides in a steering mechanism with time rate action in which the rate action effect remains preserved during operation of the steering mechanism.

A further object of the present invention resides in a steering mechanism with time-rate action in which the vehicle wheels can be steered manually in case of failure of the servo-assist.

Still another object of the present invention resides in a steering mechanism with time-rate action which is suitable both for manual as well as servo-steering systems.

A still further object of the present invention resides in a steering mechanism of the type described above which is capable of handling relatively large steering forces, as might be required for manual steering, yet is also suitable for use as servo-steering gear.

Another object of the present invention resides in a steering mechanism of the type described above in which a gearing connection remains preserved between the steering wheel and the steered vehicle wheels in case of failure of the servo-force.

Figure 2:
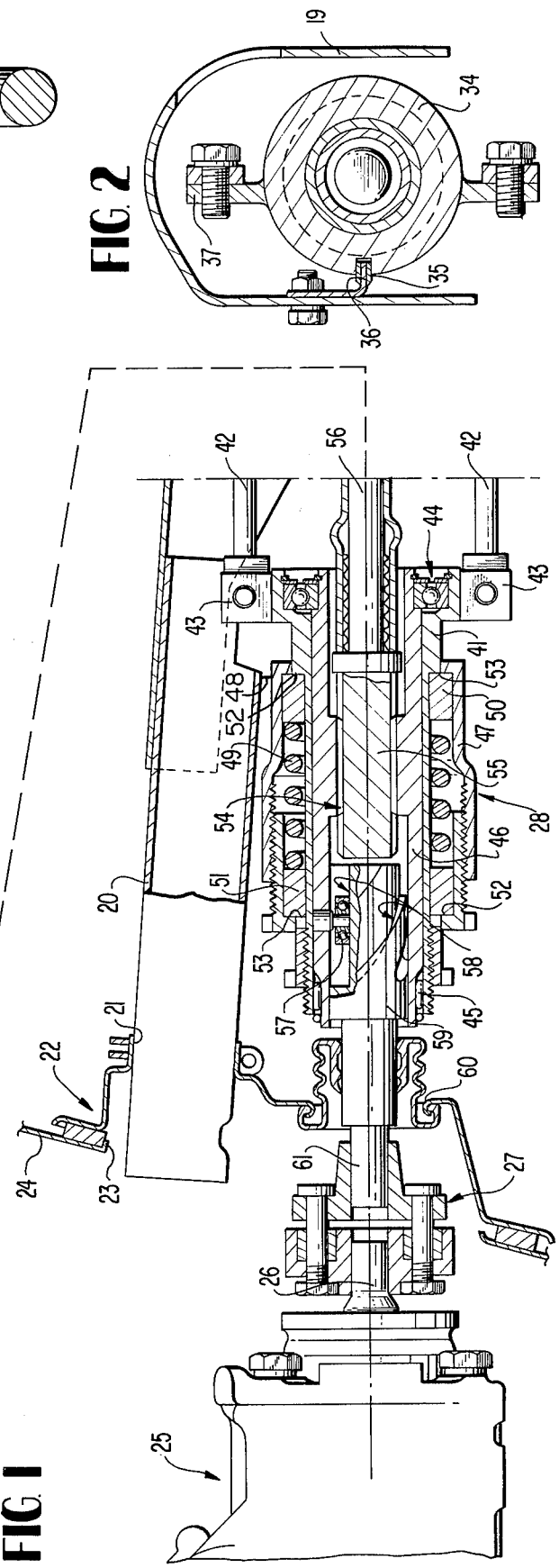

These and other objects, features and advantages of the present invention will become more apparent from the following description when taken in connection with the accompanying drawing which shows, for purposes of illustration only, one embodiment in accordance with the present invention, and wherein:

FIG. 1 is an axial cross-sectional view, containing the axis of rotation of the steering wheel, through the steering mechanism according to the present invention; and FIG. 2 is a transverse cross-sectional view through the steering mechanism according to the present invention, taken along line II—II of FIG. 1, perpendicularly to the axis of rotation of the steering hand-wheel.

Referring now to the drawing wherein like reference numerals are used throughout the two views to designate like parts, the steering-hand-wheel 10 is non-rotatably connected by way of an impact pot 11 with a hub 12 which, in its turn, is securely connected with the upper end of a tubularly shaped steering spindle generally designated by reference numeral 13. This upper end of the steering spindle 13 is rotatably and axially non-displaceably supported in a bearing neck 14 of a bearing bracket generally designated by reference numeral 15 by means of two roller bearings 16 and 17. The bearing bracket 15, in its turn, is securely inserted into an upper wider outer column 18 that is secured at the vehicle superstructure in any suitable manner (not shown). The upper outer column 18 is securely connected by way of a sheet metal support 19 (FIG. 2), which is U-shaped in cross section, with a lower narrow outer column 20 whose lower end is held fast against movement in an opening 21 of a cover 22 which closes off an opening 23 in the dashboard or firewall 24 of the vehicle.

A conventional servo-steering mechanism generally designated by reference numeral 25 is arranged in front of the firewall 24 whose steering worm includes a coupling pin 26 extending outside of the housing, which is gearingly connected with the steering spindle 13 by way of a steering coupling generally designated by reference numeral 27 and by way of a summation gear generally designated by reference numeral 28.

The servo-steering mechanism 25 adjusting the wheel deflection angle of the steered vehicle wheels in a manner not shown in detail, may correspond in its construction and function to any known mechanism, for example, to the servo-steering mechanism as disclosed in the German Offenlegungsschrift No. 1,940,490.

The angle of rotation of the steering worm and therewith of the coupling pin 26 is proportional to the angle of the wheel deflection of the steered vehicle wheels so that the coupling pin 26 or a steering part interconnected in the gearing connection between the latter and the steered vehicle wheels can be considered as adjusting member having an adjusting path dependent on the angle of the wheel deflection.

A conventional converter gear generally designated by reference numeral 29 for converting a rotary movement into a rectilinear movement includes a sleeve 31 having an external trapezoidal or acme thread 32; the sleeve 31 is coaxial to the axis of rotation 30 of the steering-wheel and is non-rotatably and axially immovably connected with the steering spindle 13 to be considered as adjusting member having an adjusting path dependent on the angle of the steering-wheel deflection. The sleeve 31 is threadably movably connected with an adjusting ring 34 having a corresponding internal trapezoidal or acme thread 33. For purposes of attaining the non-rotatable but axially displaceable arrangement of the adjusting ring 34 in relation to the axis of rotation 30, the adjusting ring 34 is provided at its circumference with an axial groove 35 (FIG. 2) into which engages a stop tongue 36 mounted on the sheet metal support 19. The adjusting ring 34 is additionally provided with two radial guide members 37 fixed relative thereto, with which are pivotally connected respectively one damper cylinder 38 each of two hydraulic telescopic dampers generally designated by reference numeral 39. The damping pistons 40 of the telescopic dampers 39 are pivotally connected by way of their respective piston rods 42 at radial guide members 43 of an adjusting sleeve 41 which is rotatably but axially non-displaceably supported on a sleeve 46 forming the summation member of the summation gear 28 by means of two roller bearing arrangements 44 and 45. The adjusting sleeve 41 is so fixed at the sheet metal support 19—in a manner similar as illustrated in FIG. 2 in connection with the parts 35 and 36—that it is non-rotatably but axially displaceably arranged in relation to the axis of rotation 30 in order to avoid a deflection of the piston rod 42 relative to the respective longitudinal axis of its damper cylinder 38.

The adjusting sleeve 41 extends through a ring-shaped spring housing 47 which is secured at 48 at the narrow outer column 20 and accommodates two ring-shaped spring plates or washers 50 and 51 with a support spring 49 clamped-in between the two spring plates or washers 50 and 51. In the illustrated center position of the steering wheel 10 for a straight drive, the spring plates 50 and 51 abut both at an abutment surface 52 fixed relative to the spring housing 47 as also at an abutment surface 53 fixed with resepct to the adjusting sleeve 41 so that the damper pistons 40 are elastically supported in the direction of the axis of rotation 30 against housings by way of the support spring 49.

The sleeve 46 operating as summation member is connected non-rotatably but displaceably in the directions of the axis of rotation with a transmission spline shaft 55 by way of a spline connection 54. The lower end of the steering spindle 13 is pressed onto a coaxial connecting pin 56 of the transmission spline shaft 55 so that the steering wheel 10 and the transmission spline shaft 55 are securely connected with each other.

The sleeve 46 is additionally provided at its internal circumference with engaging members 57 which engage into spiral grooves 58 of a further transmission shaft 59 which extends with clearance through a second opening 60 of the cover 22 and includes a coaxialy coupling pin 61 which is connected non-rotatably but axially non-displaceably with the coupling pin 26 by way of the steering coupling 27.

The engaging members 57 and spiral grooves 58 form a further converter transmission in order to convert the movements of the adjusting sleeve 41 directed coaxially to the axis of rotation 30 into rotary movements.

The angle of the steering-hand-wheel deflection is transmitted by way of the spline teeth 54 and the engagement members 57 with the transmission ratio of 1 : 1 onto the transmission shaft 59 and therewith onto the steering worm of the servo-steering mechanism 25. With more rapid steering wheel deflections, a damping resistance increasing in dependence on the angular velocity of the steering wheel 10 occurs in the telescopic dampers 39, which damping resistance displaces the adjusting sleeve 41 in the respective direction of the axis of rotation 30 while compressing the support spring 49, whereby the engaging members 57 are also displaced relative to the transmission shaft 59 in the respective direction of the axis of rotation 30 and impart by way of the spiral grooves 58 of the axially fixed transmission shaft 59 an additional angular component which is introduced into the servo-steering mechanism 25 as time-rate action or time-derivative action.

In lieu of several telescopic dampers, also a single ring-shaped telescopic damper which is arranged coaxially to the axis of rotation 30, may be interconnected between the adjusting sleeve 41 and the adjusting ring 34. The one ring-shaped damper part may thereby be either rigidly connected or be made in one part with the adjusting ring 34 and the other ring-shaped damper part with the adjusting sleeve 41 or with the sleeve 46.

In lieu of the servo-steering mechanism 25, also a steering gear operating without servo-assist may be provided. The summation gear, the converter gear, as also the ring-shaped telescopic damper may then be arranged in the housing of this steering gear.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A steering mechanism with time-rate action for vehicles, in which the wheel deflection angle of the steered vehicle wheels is composed of an angle component dependent on the angle of the steering wheel deflection and of an angle component dependent on the angular velocity of the steering wheel deflection and which includes a first adjusting means operatively connected with the steerable vehicle wheels and having an adjusting path dependent on the wheel deflection angle, a second adjusting means operatively connected with the steering wheel and having an adjusting path dependent on the angle of the steering wheel deflection, and a third adjusting means operatively connected with the steering wheel by way of a means producing an adjusting magnitude dependent on the angular velocity of the steering wheel deflection and having an adjusting path dependent on said angular deflection, characterized in that said second adjusting means is gearingly connected without interconnection of elastic means with the steering wheel as also with the two other adjusting means by way of a summation transmission means.

2. A steering mechanism according to claim 1, characterized in that said second adjusting means is inherently non-elastic.

3. A steering mechanism with a steering spindle according to claim 2, characterized in that the second adjusting means includes the steering spindle.

4. A steering mechanism according to claim 3, characterized in that the first adjusting means includes a coupling pin and the third adjusting means an adjusting sleeve.

5. A steering mechanism according to claim 4, characterized by a coaxial summation transmission means having three transmission members with a common axis of rotation arranged coaxially to the axis of rotation of the steering wheel, one of the transmission members of the summation transmission means being operatively connected with the steering wheel and another transmission member being operatively connected gearingly with the vehicle wheels.

6. A steering mechanism according to claim 5, characterized in that the three transmission members of the summation transmission means include respectively a sleeve, a spline shaft and a transmission shaft, the spline shaft being operatively connected with the steering wheel and the transmission shaft being operatively connected gearingly with the coupling pin of the first adjusting means.

7. A steering mechanism according to claim 6, characterized by a damping means having two damping members displaceable relative to one another and supplying a damping resistance between the damping members dependent on the relative velocity of the damping members, a first converter transmission means for converting a rotating movement into a rectilinear movement and including a transmission member carrying out rectilinear movement, one of the two damping members being immovably connected with the transmission member carrying out the rectilinear movements of the converter transmission means, the axis of rotation of the first converter transmission means being arranged substantially coaxially to the axis of rotation of the steering wheel and the transmission member of the converter transmission means carrying out rotary movements being non-rotatably connected with the steering wheel, while the other damping member is operatively connected with a transmission member of a second converter transmission means for converting a rectilinear movement into a rotary movement, said last-mentioned transmission member of the second converter transmission-means carrying out rectilinear movements, and the axis of rotation of the second converter transmission means being arranged substantially coaxially to the axis of rotation of the steering wheel while the transmission member of the second converter transmission means carrying out rotary movements is operatively connected gearingly with the steered vehicle wheels by way of the summation transmission means.

8. A steering mechanism according to claim 7, characterized in that the damping means is a telescopic damping means including at least one damping cylinder and a damping piston therein as damping members, the transmission member of the first converter transmission means which carries out the rectilinear movements being an adjusting ring means and being operatively connected with the damping cylinder, while the transmission member of the first-mentioned converter transmission means carrying out the rotary movements is a sleeve means which is non-rotatably connected with the steering wheel, and the damper piston forming the other damping member of the damping means is operatively connected with the transmission member of the second converter transmission means carrying out the rectilinear movements.

9. A steering mechanism according to claim 8, characterized in that the summation transmission means is constructed itself as converter transmission means and is so arranged that a spline shaft forming one of the transmission members of the summation transmission means which is operatively connected with the steering spindle forming part of the second adjusting means, and a transmission shaft forming another transmission member of the summation transmission means which is operatively connected with the coupling pin of the first adjusting means are essentially immovable in the directions of the axis of rotation of the transmission, and in that the sleeve means forming the summation member of the summation transmission means which is operatively connected with the damping piston forming the other damping member, is movably arranged in the directions of the axis of rotation of the transmission and is non-rotatable with respect to the spline shaft forming the transmission member of the summation transmission means dependent on the angle of the steering wheel deflection and movable in the directions of the axis of rotation of the transmission whereas it is operatively connected with the transmission shaft forming the transmission member of the summation transmission means dependent on the wheel deflection angle by way of engaging surface means extending at an angle to the axis of rotation of the transmission in such a manner that the transmission shaft forming the third transmission member of the summation transmission means is set into rotation both by a rectilinear movement of the sleeve means forming the summation member as also by a rotary movement thereof.

10. A steering mechanism according to claim 9, characterized in that the engaging surface means are spiral grooves.

11. A steering mechanism according to claim 9, characterized in that the damper piston forming the other damping member is operatively connected with an adjusting sleeve means substantially coaxial to the axis of rotation of the steering wheel, which is rotatably connected with the sleeve means forming the transmission member associated with the damper piston forming the other damping member but is essentially immovably connected therewith in the directions of the axis of rotation of the transmission.

12. A steering mechanism according to claim 11, characterized in that the adjusting sleeve means is non-rotatably fixed in relation to the axis of rotation of the transmission.

13. A steering mechanism according to claim 12, characterized in that the adjusting sleeve means includes two abutment means arranged at a distance to one another in the direction of the axis of rotation of the transmission for two spring abutments movably arranged in the directions of the axis of rotation of the transmission and clamping therebetween a support spring means.

14. A steering mechanism according to claim 13, characterized in that the support spring means is coaxial to the axis of rotation of the transmission.

15. A steering mechanism according to claim 13, characterized in that each spring abutment, in the center position of the steering wheel for a straight drive, is supported at its abutment means of the adjusting sleeve means as also at a relatively fixed abutment means.

16. A steering mechanism according to claim 15, characterized in that the damping cylinder is disposed essentially coaxially and essentially non-rotatably to the axis of rotation of the steering wheel, and in that the adjusting ring means is movably arranged in the directions of the axis of rotation of the steering wheel and is spirally movably connected with the steering wheel.

17. A steering mechanism according to claim 16, characterized by several telescopic damper means hydraulically connected with the transmission member carrying out the rectilinear movements of the converter transmission means.

18. A steering mechanism according to claim 17, characterized in that said last-mentioned one transmission member is part of the adjusting ring means.

19. A steering mechanism according to claim 17, characterized by a servo-steering means operatively connected between the transmission shaft forming the transmission member of the summation transmission means dependent on the wheel deflection angle, on the one hand, and the steered vehicle wheels, on the other.

20. A steering mechanism according to claim 1, characterized by a coaxial summation transmission means having three transmission members with a common axis of rotation arranged coaxially to the axis of rotation of the steering wheel, one of the transmission members of the summation transmission means being operatively connected with the steering wheel and another transmission member being operatively connected gearingly with the vehicle wheels.

21. A steering mechanism according to claim 20, characterized by a damping means having two damping members displaceable relative to one another and supplying a damping resistance between the damping members dependent on the relative velocity of the damping members, a first converter transmission means for converting a rotating movement into a rectilinear movement and including a transmission member carrying out rectilinear movements, one of the two damping members being immovably connected with the transmission member carrying out the rectilinear movements of the converter transmission means, the axis of rotation of the first converter transmission means being arranged substantially coaxially to the axis of rotation of the steering wheel and the transmission member of the converter transmission means carrying out rotary movements being non-rotatably connected with the steering gear, while the other damping member is operatively connected with a transmission member of a second converter transmission means for converting a rectilinear movement into a rotary movement, said last-mentioned transmission member of the second converter transmission means carrying out rectilinear movements, and the axis of rotation of the second converter transmission means being arranged substantially coaxially to the axis of rotation of the steering wheel while the transmission member of the second converter transmission means carrying out rotary movements is operatively connected gearingly with the steered vehicle wheels by way of the summation transmission means.

22. A steering mechanism according to claim 21, characterized in that the summation transmission means is constructed itself as converter transmission means and is so arranged that one of the transmission members of the summation transmission means which is operatively connected with the second adjusting means, and another transmission member of the summation transmission means which is operatively connected with the first adjusting means are essentially immovable in the directions of the axis of rotation of the transmission, and in that the summation member of the summation transmission means which is operatively connected with the other damping member, is movably arranged in the directions of the axis of rotation of the transmission and is non-rotatable with respect to the transmission member of the summation transmission means dependent on the angle of the steering wheel deflection and movable in the directions of the axis of rotation of the transmission whereas it is operatively connected with the transmission member of the summation transmission means dependent on the wheel deflection angle by way of engaging surface means extending at an angle to the axis of rotation of the transmission in such a manner that the third transmission member of the summation transmission means is set into rotation both by a rectilinear movement of the summation member as also by a rotary movement thereof.

23. A steering mechanism according to claim 21, characterized in that the other damping member is operatively connected with an adjusting sleeve means substantially coaxial to the axis of rotation of the steering wheel, which is rotatably connected with the transmission member associated with the other damping member but is essentially immovably connected therewith in the directions of the axis of rotation of the transmission.

24. A steering mechanism according to claim 23, characterized in that the adjusting sleeve means is non-rotatably fixed in relation to the axis of rotation of the transmission.

25. A steering mechanism according to claim 23, characterized in that the adjusting sleeve means includes two abutment means arranged at a distance to one another in the direction of the axis of rotation of the transmission for two spring abutments movably arranged in the directions of the axis of rotation of the transmission and clamping therebetween a support spring means.

26. A steering mechanism according to claim 25, characterized in that each spring abutment, in the center position of the steering wheel for a straight drive, is supported at its abutment means of the adjusting sleeve means as also at a relatively fixed abutment means.

27. A steering mechanism according to claim 21, characterized in that the one damping member is operatively connected with an adjusting ring means disposed essentially coaxially and essentially non-rotatably to the axis of rotation of the steering wheel, and in that the adjusting ring means is movably arranged in the directions of the axis of rotation of the steering wheel and is spirally movably connected with the steering wheel.

28. A steering mechanism according to claim 21, characterized by several telescopic damper means hydraulically connected with the transmission member carrying out the rectilinear movements of the converter transmission means.

29. A steering mechanism according to claim 20, characterized by a servo-steering means operatively connected between the transmission member of the summation transmission means dependent on the wheel deflection angle, on the one hand, and the steered vehicle wheels, on the other.

* * * * *